United States Patent
Hood

(10) Patent No.: US 9,032,259 B1
(45) Date of Patent: May 12, 2015

(54) TEST PRIORITIZATION TECHNIQUES

(75) Inventor: James L. Hood, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 404 days.

(21) Appl. No.: 13/408,673

(22) Filed: Feb. 29, 2012

(51) Int. Cl.
*G06F 11/00* (2006.01)
*G06F 11/34* (2006.01)

(52) U.S. Cl.
CPC ..................................... *G06F 11/34* (2013.01)

(58) Field of Classification Search
CPC ..... G06F 11/32; G06F 11/321; G06F 11/327; G06F 11/079; G06F 11/263; G06F 11/0793; G06F 11/0772; G06F 11/0766; G06F 11/0781; G06F 11/0769
USPC .......................................... 714/32, 27, 48, 57
See application file for complete search history.

(56) References Cited

U.S. PATENT DOCUMENTS

| | | | |
|---|---|---|---|
| 5,771,243 A * | 6/1998 | Lee et al. ...................... | 714/738 |
| 6,760,873 B1 * | 7/2004 | Hao et al. ...................... | 714/724 |
| 2005/0257086 A1 * | 11/2005 | Triou et al. ..................... | 714/25 |
| 2008/0010537 A1 * | 1/2008 | Hayutin et al. ................. | 714/38 |
| 2008/0148120 A1 * | 6/2008 | Seuring ......................... | 714/742 |
| 2009/0177936 A1 * | 7/2009 | Koenemann et al. ......... | 714/737 |

* cited by examiner

*Primary Examiner* — Yair Leibovich
(74) *Attorney, Agent, or Firm* — Kilpatrick Townsend & Stockton LLP

(57) ABSTRACT

Systems and methods involve prioritizing information based at least in part on test results for tests. A computing device may administer one or more tests and/or may receive test results for one or more tests. Multiple executions of one or more tests may be administered over a period of time. A device administering a test may evaluate the functionality of at least a portion of an application programming interface (API) or at least a portion of a user interface. Test results may be analyzed to determine a failure pattern and/or pass rate for one or more tests. Test results may be analyzed to determine an error signature and/or error signature frequency for one or more test results. A report can be generated that prioritizes information based at least in part on the tests, test results, and/or any determined information.

24 Claims, 9 Drawing Sheets

800

Test Report

| Test Name | Test History | Failure Pattern | Pass Rate | Max Error Signature Frequency |
|---|---|---|---|---|
| User Interface 3 | 0000000000 | Always Fails | 0.0 | 1.0 |
| User Interface 1 | 0000–0–000 | Always Fails | 0.0 | 0.5 |
| API 3 | 11–1100000 | Seems Broken | 0.4 | 0.6 |
| API 2 | 1111111000 | Seems Broken | 0.7 | 1.0 |
| User Interface 4 | 0000001111 | Appears Fixed | 0.4 | 0.7 |
| User Interface 2 | 1100111111 | Appears Fixed | 0.8 | 0.5 |
| API 1 | 1111111111 | Always Passes | 100 | 0 |

Test Report

| Test Name | Number of Test Runs | Number of Test Errors | Pass Rate | Last Run |
|---|---|---|---|---|
| User Interface Test 4 | 1 | 1 | 0.00 | Today |
| User Interface Test 1 | 59 | 8 | 86.44 | Today |
| User Interface Test 3 | 49 | 5 | 89.80 | Today |
| API Test 1 | 214 | 12 | 94.39 | Today |
| User Interface Test 2 | 343 | 12 | 96.50 | Today |

FIGURE 7

Test Report

| Test Name | Test History | Failure Pattern | Pass Rate | Max Error Signature Frequency |
|---|---|---|---|---|
| User Interface 3 | 0000000000 | Always Fails | 0.0 | 1.0 |
| User Interface 1 | 0000-0-000 | Always Fails | 0.0 | 0.5 |
| API 3 | 11-1100000 | Seems Broken | 0.4 | 0.6 |
| API 2 | 1111111000 | Seems Broken | 0.7 | 1.0 |
| User Interface 4 | 0000001111 | Appears Fixed | 0.4 | 0.7 |
| User Interface 2 | 1100111111 | Appears Fixed | 0.8 | 0.5 |
| API 1 | 1111111111 | Always Passes | 100 | 0 |

FIGURE 8

TEST PRIORITIZATION TECHNIQUES

BACKGROUND

As the complexity of computer systems increases, the time required to debug applications associated with computer systems often increases as well. For example, modern organizations often operate computer networks that implement numerous services. A single transaction with the computer network can involve many of these services and each service may itself utilize numerous devices in the network. For example, a web-based application may contain dependencies on numerous servers, databases, scripts, and the like. The time required to continually test and verify that components of a system are operational often increases as the number of dependencies in the application increases. Tests may be performed that verify whether a portion or all of a system, such as a user interface or an application programming interface, is operational. Such tests, however, are often difficult to implement due to a number of reasons, such as inconsistent results, temporary glitches, and the like. Accordingly, testing and diagnosis can require valuable resources being expended to evaluate potential problems. Further, conventional testing techniques may result in a less-than-ideal allocation of resources.

BRIEF DESCRIPTION OF THE DRAWINGS

FIG. 7 illustrates a prioritized report according to an embodiment.

FIG. 8 illustrates a prioritized report according to an embodiment.

DETAILED DESCRIPTION

Figure 1:
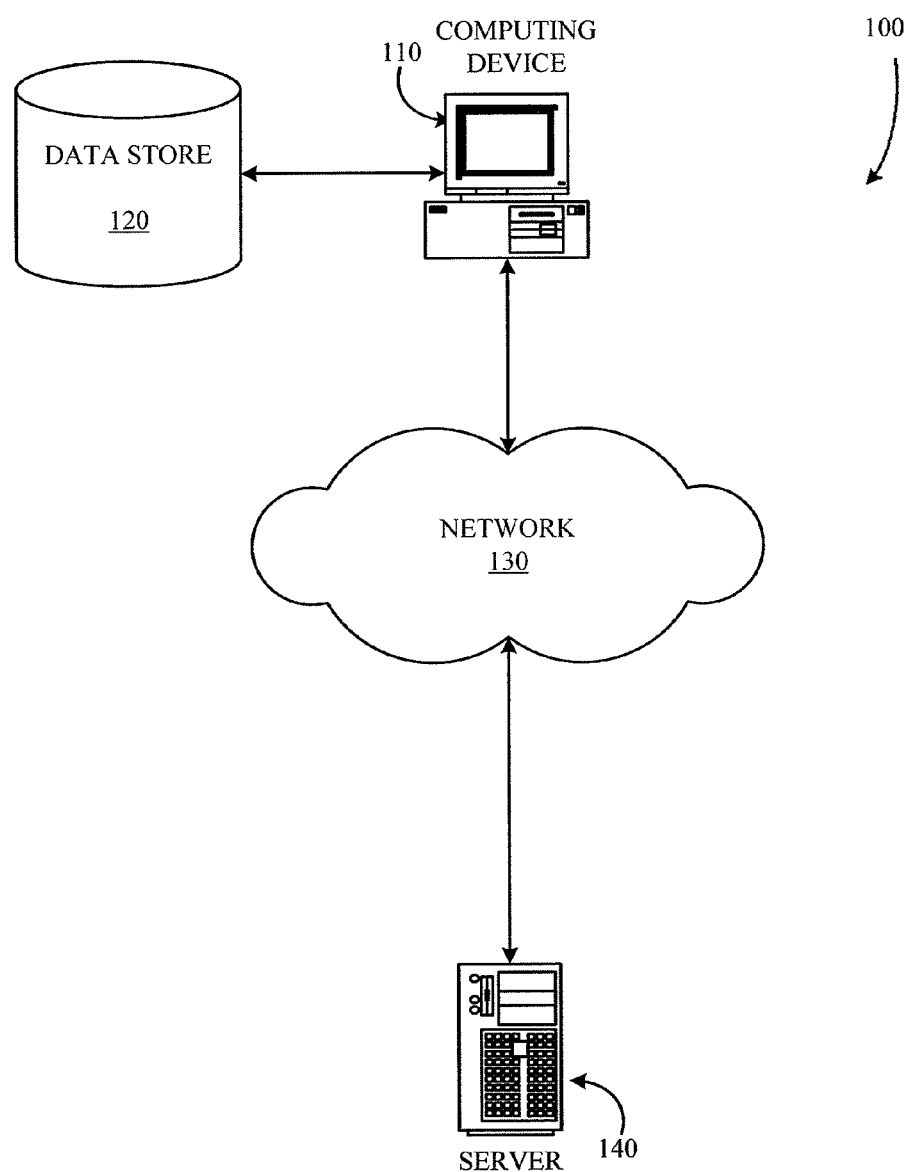
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein prioritize various tests based at least in part on test results for the tests. In a particular illustrative embodiment, numerous tests are each performed multiple times over a period of time. For example, a test that verifies whether all or part of a particular application programming interface (API) is operational may be performed on a daily basis. As another example, a test that verifies whether all or part of a particular user interface is operational may be performed every other day. Tests may be performed at various times including, but not limited to, hourly, daily, weekly, bi-weekly, monthly, on demand, or at other times.

The test results from some or all of these tests may be recorded. For example, test results for tests may be stored in one or more databases. Test results can include information such as a timestamp indicating when the test was performed, an indicator indicating whether the test was successful, and an error message if the test was unsuccessful. Numerous additional embodiments are disclosed herein and variations of embodiments explicitly disclosed herein are considered as being within the scope of the present disclosure.

The test results for one or more tests taken over a period of time can be analyzed. For example, five tests may be performed on an hourly basis and the results for each of these tests may be saved in a database. The test results from one or more of these tests may be analyzed. In one illustrative embodiment, the test results from three of the tests are analyzed over a two week period of time. In another illustrative embodiment, the test results from all five tests are analyzed over a monthly period of time. The number of tests selected to be analyzed may be automatically or manually determined. Likewise, the period of time in which test results for the selected tests should be analyzed may be automatically or manually determined. For example, the period of time in which test results are analyzed may be an hour, day, week, every other week, month, year, some combination thereof, or another period of time. The period of time may be dynamically selected. For example, in one embodiment, a particular number of test results for each test may be determined.

The tests and test results selected or determined to be analyzed can be analyzed in any number of ways. A pattern for a test can be determined based at least in part on a pattern of the successive indicators of the test results for a particular test. For example, if ten test results for a particular test are determined to be analyzed, then the test results for this test may be organized from the oldest test result to the newest test result. In other words, the test results for this test may be analyzed in order from the test result associated with the oldest timestamp to the test result associated with the most current time stamp. In one embodiment, the indicator for each test result indicating whether a test was successful or unsuccessful is analyzed. Thus, if the indicators for the ten test results for the test are "1111111111", where "1" indicates that the test was successful, then it may be determined that a pattern associated with the test results for that test is "always passes". Similarly, if the indicators for the ten test results for the test are "0000000000", where "0" indicates that the test was unsuccessful, then it may be determined that a pattern associated with the test results for that test is "always fails".

Any number of patterns may be dynamically determined or selected from a pre-defined list of patterns. For example, referring back to the previous example, if the ten test results for the test are "1111100000", then it may be determined that a pattern associated with the test results for the test is "appears broken". As another example, if the ten test results for the test are "0000011111" or "1110011111", then it may be determined that a pattern associated with the test results for the test is "appears fixed." There may be one or more pattern categories that indicate that a pattern cannot be determined. For example, if the ten test results for the test are "1010101010" or "1100110101" then a particular pattern may be unable to be determined and therefore the test may be assigned a pattern such as "flaky" or "inconsistent."

A pass rate for a test may be determined based at least in part on the test results for a particular test that are analyzed. The pass rate may reflect how often the test was successful. For example, in one embodiment, a pass rate for a test is calculated by dividing the number of test results that have indicators indicating that the test was successful by the number of test results for the test. Thus, in an embodiment, if the ten test results for a test to be analyzed are "1010101011", then the pass rate would be calculated as 6/10 or 0.60 or 60%. Numerous additional embodiments are disclosed herein and variations of embodiments explicitly disclosed herein are considered as being within the scope of the present disclosure.

If a test result has an indicator indicating that the test was unsuccessful and if the test result is associated with an error message, then an error signature for the test result may be determined. An error signature can be a unique or substantially unique signature based on the error message associated with the test result. For example, the error signature for a test result may be determined by taking a hash, such as a secure hash algorithm (SHA) hash, such as a SHA1 hash, of the error message. In embodiments, each test result having the same error message will have the same error signature.

An error signature frequency may be determined based at least in part on the test results that are analyzed. The error signature frequency can reflect how often a particular error signature occurred within a particular test or throughout the test results. In one embodiment, an error signature frequency is based at least in part on a number of same error signatures and a total number of error signatures. For example, ten test results for a first test and five test results for a second test may be analyzed. In this example, four of the ten test results for the first test and one of the five test results for the second test may be associated with an error signature of "c8dc3c55176e1119f8b91dcb411f2ab048b3a2d8" which is the SHA1 hash of a "Error establishing database connection" error message associated with each of these test results. In addition, in this embodiment, five of the ten tests results for the first test are associated with a second error signature and one of the ten tests results for the first test indicate that the test was successful. Furthermore, in this embodiment, three of the five test results for the second test are associated with a third error signature and one of the five test results for the second test indicate that the test was successful. Using this example, in one embodiment, the error signature frequency of "c8dc3c55176e1119f8b91dcb411f2ab048b3a2d8" for the first test may be determined to be 44.4% (i.e. four test results for the first test having the error signature out of nine test results for the first test indicating failure) and the error signature frequency of "c8dc3c55176e1119f8b91dcb411f2ab048b3a2d8" for the second test may be determined to be 25% (i.e. one test result for the second test having the error signature out of four test results for the second test indicating failure). In another embodiment, the error signature frequency of "c8dc3c55176e1119f8b91dcb411f2ab048b3a2d8" may be determined to be 38.46% across the first and second tests (i.e. five test results having the error signature out of thirteen total test results for the first and second tests indicating failure).

As another example, in an embodiment, ten test results for a first test and five test results for a second test may be analyzed. In this example, four of the ten test results for the first test and one of the five test results for the second test may be associated with an error signature of "c8dc3c55176e1119f8b91dcb411f2ab048b3a2d8" which is the SHA1 hash of a "Error establishing database connection" error message associated with each of these test results. Using this example, in one embodiment, the error signature frequency of "c8dc3c55176e1119f8b91dcb411f2ab048b3a2d8" for the first test may be determined to be 40% (i.e. four test results for the first test having the error signature out of ten test results for the first test) and the error signature frequency of "c8dc3c55176e1119f8b91dcb411f2ab048b3a2d8" for the second test may be determined to be 20% (i.e. one test result for the second test having the error signature out of five test results for the second test). In another embodiment, the error signature frequency of "c8dc3c55176e1119f8b91dcb411f2ab048b3a2d8" may be determined to be 33.33% (i.e. five test results having the error signature out of fifteen total test results).

One or more prioritized report may be generated. A prioritized report may be based at least in part on any determined failure patterns, pass rates, error signatures, and/or error signature frequencies. For example, a test having a failure pattern of "always fails" may have red text or have a red background so as to visually distinguish the test from other tests. Thus, in embodiments, red text or a red background associated with a test may indicate a high priority for the test. As another example, if a test has a failure pattern of "appears broken" then the text or the background color associated with this test may be yellow. Thus, in embodiments, yellow text or a yellow background associated with a test may indicate a medium priority for the test. The tests and/or test results may be ordered based on a priority schema. In one embodiment, tests are ordered first by failure pattern from highest priority to lowest priority and then by pass rate from lowest pass rate to highest pass rate. Numerous additional embodiments are disclosed herein and variations of embodiments explicitly disclosed herein are considered as being within the scope of the present disclosure.

One or more of the generated reports may be sent or otherwise made available. For example, an email comprising one or more generated reports may be sent to an appropriate email address. As another example, one or more generated reports may be made available, such as through a graphical user interface. In one embodiment, a user can dynamically generate a prioritized report and view the report on a display associated with the user.

Referring now to FIG. 1, the figure illustrates an environment 100 in which various embodiments can be implemented. The environment 100 shown in FIG. 1 includes a computing device 110, a data store 120, a network 130, and a server 140. The computing device 110 shown in FIG. 1 can send and receive information to and from data store 120. In addition, the computing device 110 can send and receive information to and from server 140 through network 130.

The computing device 110 shown in FIG. 1 is in communication with data store 120 and network 130. The computing device 110 may access test results for one or more tests from data store 120, such as described in more detail below. In embodiments, the computing device 110 may be any device capable of communication with a network, such as network 130, and/or capable of communicating with a data store, such as data store 120. For example, in FIG. 1, the computing device 110 is a desktop computer. In other embodiments, the computing device 110 may be a tablet computer, a mobile phone, a laptop, or another suitable computing device. The computing device 110 in FIG. 1 is connected to data store 120. In embodiments, the computing device 110 may comprise one or more data stores and/or may be able to connect to one or more data stores either directly or through one or more wired and/or wireless network connections. The computing device 110 in FIG. 1 is connected to network 130. In embodiments, the computing device 110 may be in communication with one or more networks through one or more wired and/or wireless connections. Furthermore, the computing device 110 may be in communication with any number of other devices, such as other desktops, laptops, mobile devices, servers, data stores, etc.

In embodiments, the computing device 110 comprises a computer-readable medium such as a random access memory (RAM) coupled to a processor that executes computer-executable program instructions and/or accesses information stored in memory. For example, computing device 110 may comprise a computer-readable medium that has program code stored thereon for executing one or more tests, as described herein. In one embodiment, computing device 110 comprises a computer-readable medium that has program code stored thereon for storing the test results for one or more tests to memory or to a data store, such as data store 120. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the computing device 110 may comprise a single type of computer-readable medium such as random access memory (RAM). In other embodiments, the computing device 110 may comprise two or more types of computer-readable medium such as random access memory (RAM), a disk drive, and cache. The computing device 110 may be in communication with one or more external computer-readable mediums such as an external hard disk drive or an external DVD drive.

In embodiments, the computing device 110 comprises a processor which executes computer-executable program instructions and/or accesses information stored in memory. For example, a processor in computing device 110 may execute program code stored in memory for executing one or more tests, such as on a periodic basis on in response to a request to perform the one or more tests, store test results to data store 120, analyze test results, and/or generate a prioritized report. The instructions may comprise processor-specific instructions generated by a compiler and/or an interpreter from code written in any suitable computer-programming language including, for example, C, C++, C#, Visual Basic, Java, Python, Perl, Ruby, and JavaScript. In an embodiment, the computing device 110 comprises a single processor. In other embodiments, the computing device 110 comprises two or more processors.

The computing device 110 shown in FIG. 1 can comprise a network interface for communicating via wired or wireless communication. For example, computing device 110 may comprise a network interface that is used to connect to network 130 and send information to and/or receive information from server 140. For example, a network interface may allow for communication over networks via Ethernet, IEEE 802.11 (Wi-Fi), 802.16 (Wi-Max), Bluetooth, infrared, etc. As another example, a network interface may allow for communication over networks such as CDMA, GSM, UMTS, or other cellular communication networks. The computing device 110 may comprise two or more network interfaces for communication over one or more networks.

In embodiments, the computing device 110 may comprise or be in communication with a number of external or internal devices such as a mouse, a CD-ROM, DVD, a keyboard, a display, audio speakers, one or more microphones, or any other input or output devices. A display may use any suitable technology including, but not limited to, LCD, LED, CRT, and the like.

The data store 120 shown in FIG. 1 is in communication with computing device 110. In embodiments, the data store 120 is operable, through logic associated therewith, to receive instructions from computing device 110, network 130, server 140, or a combination thereof, and obtain, update, or otherwise process data in response thereto. Data store 120 may contain information associated with one or more tests and/or one or more test results. For example, in one embodiment, data store 120 contains test results information for a plurality of tests. Such test result information can include a timestamp specifying a date and time a test was performed, a test name associated with the test result, an indictor indicating whether the test was successful, an error message if the test was unsuccessful, and other information. Data store 120 shown in FIG. 1 can receive requests from computing device 110 and send responses to computing device 110. For example, computing device 110 may request information associated with a specific test result from data store 120. In response to receiving the request, data store 120 may send the requested information for the test result to computing device 110. In embodiments, data store 120 can add and/or update information in the data store based on information received from computing device 110. In embodiments, data store 120 can send, receive, add, update, or otherwise manipulate information based at least in part on one or more requests received from another device or network, such as computing device 110, network 130, server 140, or another network or device in communication with data store 120.

The network 130 shown in FIG. 1 is in communication with and facilitates communications between computing device 110 and server 140. In embodiments, network 130 may be any suitable number or types of networks or links, including but not limited to a dial-in network, a local area network (LAN), a wide area network (WAN), a public switched telephone network (PSTN), the Internet, an intranet or any combination of wired and/or wireless communication links. In the embodiment shown in FIG. 1, network 130 is a single network. In embodiments, network 130 may be two or more networks and/or a network that is managed by multiple entities. In embodiments, network 130 may be associated with various devices such as gateways, routers, switches, repeaters, or other devices.

One or more connections to network 130 may be provided through an Internet Service Provider (ISP). An ISP can be any organization that provides a customer with access to the internet. An ISP may connect customers to the internet using various types of connections or technologies including, but not limited to, copper wires, dial-up, digital subscriber line (DSL), asymmetric digital subscriber line (ASDL), wireless technologies, fiber optics, or integrated services digital network (ISDN). In embodiments, an ISP may be associated with various devices such as gateways, routers, switches, repeaters, or other devices.

The server 140 shown in FIG. 1 is in communication with computing device 110 through network 130. In embodiments, server 140 may be any device capable of communicating with a network, such as network 130, and capable of sending and receiving information to and from another device. For example, in the embodiment shown in FIG. 1, server 140 may receive a request from computing device 110 through network 130. In this embodiment, server 140 may respond to the request by sending information to the computing device 110 through network 130. For example, server 140 may be associated with any number of application programming interfaces (APIs) and/or one or more user interfaces, such as a web-based user interface. Another device in communication with server 140, such as computing device 110, may request information about one of the APIs and/or user interfaces and, in response, the server 140 may send a response with the requested information to the requesting device. In an embodiment, computing device 110 or another computing device in communication with server 140 may send a request to server 140. In this embodiment, the request may be designed to test all or a portion of one or more APIs and/or all or a portion of one or more user interfaces. In this embodiment, the requesting device can determine a result for the test based at least in part on the response from server 140, or lack thereof. In other embodiments, server 140 may execute one or more tests designed to verify whether all or a portion of one or more APIs and/or all or a portion of one or more user interfaces is operational. Information associated with tests and/or test results may be stored in a data store, such as data store 120.

In embodiments, the server 140 comprises a computer-readable medium such as a random access memory (RAM) coupled to a processor that executes computer-executable program instructions and/or accesses information stored in memory. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the server 140 may comprise a single type of computer-readable medium such as random access memory (RAM). In other embodiments, the server 140 may comprise two or more types of computer-readable medium such as random access memory (RAM), a disk drive, and cache. The server 140 may be in communication with one or more external computer-readable mediums such as an external hard disk drive or an external DVD drive.

In embodiments, the server 140 comprises a processor which executes computer-executable program instructions and/or accesses information stored in memory. The instructions may comprise processor-specific instructions generated by a compiler and/or an interpreter from code written in any suitable computer-programming language including, for example, C, C++, C#, Visual Basic, Java, Python, Perl, Ruby, and JavaScript. In an embodiment, the server 140 comprises a single processor. In other embodiments, the server 140 comprises two or more processors.

The server 140 shown in FIG. 1 can comprise a network interface for communicating via wired or wireless communication. For example, a network interface may allow for communication over networks via Ethernet, IEEE 802.11 (Wi-Fi), 802.16 (Wi-Max), Bluetooth, infrared, etc. As another example, a network interface may allow for communication over networks such as CDMA, GSM, UMTS, or other cellular communication networks. The server 140 may comprise two or more network interfaces for communication over one or more networks.

In embodiments, the server 140 may comprise or be in communication with a number of external or internal devices such as a mouse, a CD-ROM, DVD, a keyboard, a display, audio speakers, one or more microphones, or any other input or output devices. A display may use any suitable technology including, but not limited to, LCD, LED, CRT, and the like.

Figure 2:
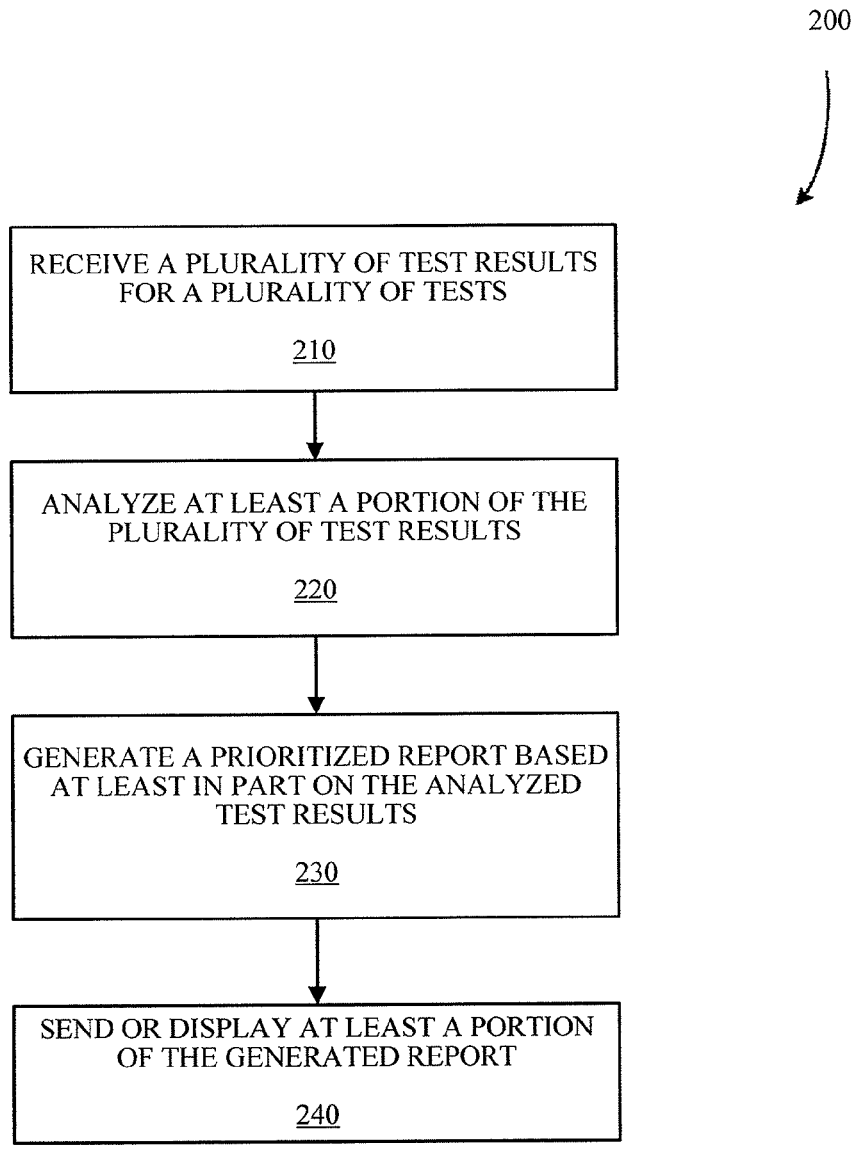
FIG. 2 is a flowchart showing an illustrative example of a process of creating a prioritized report based on a plurality of test reports for a plurality of tests according to an embodiment.

Referring now to FIG. 2, the figure is a flowchart showing an illustrative example of a process 200 of creating a prioritized report based on a plurality of test reports for a plurality of tests according to an embodiment. Some or all of the process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In embodiments, all or part of the process 200 shown in FIG. 2 may be implemented by or through one or more devices such as computing device 110, data store 120, network 130, and/or server 140 shown in FIG. 1.

The process 200 shown in FIG. 2 begins when a plurality of test results for a plurality of tests are received 210. For example, referring to FIG. 1, computing device 110 may receive a plurality of test results for a plurality of tests from data store 120 and/or server 140. As another example, server 140 may receive a plurality of test results for a plurality of tests from computing device 110 and/or data store 120. In an embodiment, computing device 110 may receive a plurality of test results for a plurality of tests from a storage medium, such as a hard drive, associated with the computing device 110. In one embodiment, the computing device 110 may receive one or more of the plurality of test results from a real-time or substantially real-time testing environment. In some embodiments, one or more devices, such as computing device 110 and/or server 140 shown in FIG. 1, may execute or otherwise perform one or more tests to obtain or store, or both, test results. As an example, computing device 110 shown in FIG. 1 may administer one or more tests that evaluate the functionality of at least a portion of an application programming interface (API) or at least a portion of a user interface (UI), or both. In an embodiment, an application programming interface (API) or code configured to cause the display of at least a portion of a user interface (UI) may reside on a server, such as server 140. In this embodiment, computing device 110 (or another suitable device) may administer one or tests which verify that at least a portion of the API and/or UI is operational. The results of the one or more tests may be stored, such as in data store 120.

In embodiments, one or more of the tests for which test results are received is designed to verify whether all or a portion of an environment is operational. For example, a test may be designed to verify whether all or part of a particular application program interface (API) is operational. For example, a test may be designed to verify whether an external API is operational by sending a request to the API and then verifying that one or more appropriate actions were performed by the API. In one embodiment, a device administering a test may attempt to create a task through an API and then verify that the task was appropriately created. In other embodiments, a device administering a test may verify that statistics associated with or provided by an API are accurate.

A test can be designed to verify whether all or part of a particular user interface is operational. For example, a device administering a test may involve the device simulating a user logging into a particular website or application, such as a web-based application, remotely managed application, or other application. In this embodiment, the device administering the test may attempt to browse to a particular web page, enter a username and a password in the appropriate fields of a form on the web page, and submit the form. The device administering the test may then verify whether it was able to log into the account associated with the entered username and password submitted. In other embodiments, a test is designed to diagnose one or more potential problems with an application programming interface (API), user interface (UI), and/or another component of one or more applications. In some embodiments, a test can be designed to diagnose whether one or more components in a computing system, such as a web-based application or remotely managed application, is functioning properly. In some embodiments, one computing device administers one or more tests. In another embodiment, two or more computing devices administer a single test or multiple tests. Numerous additional embodiments are disclosed herein and variations of embodiments explicitly disclosed herein are considered as being within the scope of the present disclosure.

A test result can include various types of information. For example, a test result may be associated with a particular execution or run of a test. In this embodiment, the test result may comprise a test name or other identifier that associates the test result with the test for which it corresponds. For example, if a test entitled "System API" is executed, then information that identifies the test result as corresponding to the "System API" test may be included in the test result. In embodiments, a test result is associated with an individual test. In other embodiments, a test result may be associated with one or more executions of an individual test and/or one or more executions of a plurality of tests.

A test result may contain information that corresponds with date and/or time that an execution of the test was implemented and/or completed. For example, a test result can be associated with a timestamp indicating when the test was performed. In embodiments, a test result contains an indicator indicating whether the test was successful or unsuccessful. For example, if a test is designed to verify that a user can log into an account by entering a username and password, then a test result for an execution of the test may include an indicator indicating whether the test was able to log into the account. Such an indicator may include any type of information that can be used to determine whether the test was successful in logging into the account. In embodiments, an indicator for a test result associated with an execution of a test can include a "1", "true", "successful", or another appropriate indicator if the test passed or a "0", "false", "unsuccessful", or another appropriate indicator if the test failed.

In embodiments, if an execution of a test is unsuccessful, then a test result associated with that execution of the test can include one or more error messages. An error message may provide an indication of a potential problem or a potential solution, or both. For example, in one illustrative embodiment, an error message provides "Unable to Connect to User Database" which indicates that there may be a problem with the network connection to the User Database or there may be a problem with a server managing the User Database. In some embodiments, an error message may provide a code segment that could not successfully be executed, a line number associated with a code segment that could not successfully be executed, or other information that indicates a point within the test that could not be completed. For example, a particular test may perform four functions that verify the availability of a portion of a web-based application. In this embodiment, if an execution of the test indicates that the function one and function two was able to be successfully completed, but that the test was unable to successfully complete function three, then the error message may indicate that the test failed at function three or may provide a name or description, or both, of the function that was attempted but failed. In other embodiments, an error message can include any type of information that may be usable to identify a potential problem associated with a test.

In an embodiment, one or more tests may be designed such that error messages associated with results of an execution of one or more of the tests are coordinated. For example, two different tests may have a same dependency. As one example, a first test may be dependent upon a connection with a products database. A second, different test may also be dependent upon a connection with the products database. In this embodiment, if an execution of the first test fails because of a connection error with the products database, then an error message, such as "Unable to Establish a Connection to the Product Database", may be included in the test result for that execution of the first test. Similarly, if an execution of the second test fails because of a connection error with the products database, then an error message, such as "Unable to Establish a Connection to the Product Database", may be included in the test result for that execution of the second test. Thus, in embodiments, error messages associated with test results across two or more tests may alone or in combination provide an indication of a common or related problem.

Referring back to FIG. 2, after receiving a plurality of test results for a plurality of tests 210, the process 200 proceeds to block 220. In block 220, at least a portion of the plurality of received test results are analyzed. For example, referring to FIG. 1, if computing device 110 receives a plurality of test results for a plurality of tests, then computing device 110 may analyze at least a portion of the test results.

At least a portion of the plurality of test results may be analyzed in any number of ways. At least a portion of the plurality of test results can be analyzed by determining a failure pattern for one or more tests associated with at least a portion of the plurality of test results. A failure pattern for a test can be determined based at least in part on a pattern of successive test results for the test. In one embodiment, each test result for a test is sorted by a timestamp associated with the test. For example, the test results may be sorted from the oldest timestamp to the newest timestamp. In some embodiments, each test result may be associated with an indicator indicating whether the test was successful or unsuccessful. In this embodiment, the indicators associated with the test results in the sorted order may be analyzed.

In some embodiments, indicators associated with successive test results may be analyzed to dynamically determine one or more patterns, such as a failure pattern for the test. In other embodiments, indicators associated with successive test results may be analyzed to determine one or more patterns, such as a failure pattern, selected from a plurality of predetermined categories. Predetermined categories can include categories such as "always fails", "appears broken", "appears fixed", "always passes", or one or more other categories. In some embodiments, if each of the indicators associated with the test results for one or more tests indicates that the test was successful, then a "always passes" pattern is determined. For example, if successive indicators for the test results associated with a test are "1111111", where "1" indicates that the test was successful, then it may be determined that a pattern for the test is "always passes". Likewise, if each of the indicators associated with the test results for one or more tests indicates that the test was unsuccessful, then a "always fails" pattern may be determined. For example, if successive indicators for the test results associated with a test are "00000", where "0" indicates that the test was unsuccessful, then it may be determined that a pattern for the test is "always fails".

In an embodiment, if successive indicators for test results associated with one or more tests indicates that executions of one or more of the tests were at first unsuccessful but are now successful, then a "appears fixed" pattern is determined. For example, if successive indicators for the test results associated with a test are "0011111111111111111", where "0" indicates that an execution of the test was unsuccessful and "1" indicates that an execution of the test was successful, then a "appears fixed" pattern may be determined for the test. As another example, if the test results associated with a test are "11110001111", then a "appears fixed" pattern may be determined according to an embodiment. In one embodiment, if a predetermined number of indicators associated with the latest test results for a test each indicate that an execution of the test was successful and if at least one indicator associated with a test result for the test indicates that an execution of the test was unsuccessful, then a "appears fixed" pattern may be determined for the test. Thus, if indicators associated with test results for a test are "0000000000111" then an "appears fixed" pattern may be determined because the indicators associated with the latest three test results for the test each indicate that the execution of test was successful. In other embodiments, an "appears fixed" pattern may be determined based at least in part on a proportion of test results having an indicator indicating that a test was successful and a total number of tests results for the test. For example, the percentage of indicators indicating that an execution of a test was successful may be compared to a threshold percentage to determine a pattern for the test.

In an embodiment, if successive indicators for test results associated with one or more tests indicates that executions of one or more of the tests were at first successful but are now unsuccessful, then a "appears broken" pattern is determined. For example, if successive indicators for the test results associated with a test are "11111111000", where "0" indicates that an execution of the test was unsuccessful and "1" indicates that an execution of the test was successful, then a "appears broken" pattern may be determined for the test. In one embodiment, if a predetermined number of indicators associated with the latest test results for a test each indicate that an execution of the test was unsuccessful and if at least one indicator associated with a test result for the test indicates that an execution of the test was successful, then a "appears broken" pattern may be determined for the test. In other embodiments, an "appears broken" pattern may be determined based at least in part on a proportion of test results having an indicator indicating that a test was unsuccessful and a total number of tests results for the test. For example, the percentage of indicators indicating that an execution of a test was unsuccessful may be compared to a threshold percentage to determine a pattern for the test.

In some embodiments, if a pattern cannot be determined or if a pattern does not match another predefined pattern category, then a "flaky," "inconsistent," or "undetermined" pattern category may be selected for the test.

At least a portion of the plurality of test results can be analyzed by determining a pass rate for one or more tests associated with at least a portion of the plurality of test results. For example, a pass rate for a test may be determined based at least in part on the test results for the test having indicators indicating that an execution of the test was successful and the number of test results for the test. In one embodiment, a pass rate is a proportion of the number of tests having indicators indicating that an execution of a test was successful. In an embodiment, a pass rate is the number of successful executions of a test divided by the total number of executions of the test. For example, if the indicators associated with test results for a test are "11010" then a pass rate for the test may be determined to be ⅗ or 60 percent (i.e. three successful indicators divided by five test results).

At least a portion of the plurality of test results may be analyzed by determining an error signature for one or more of the plurality of test results. For example, in one embodiment, an error signature is determined for each of the plurality of test results having an indicator indicating that the test was unsuccessful and having an error message. In an embodiment, each unique error message may be associated with a unique error signature. In another embodiment, each different error message can be associated with a substantially unique error signature. An error signature may be determined based at least in part on a hash of an error message associated with a test result for a test. Various suitable hash functions can include, but are not limited to, MD4, MD5, SHA-1, SHA-2, or another hashing function.

At least a portion of the plurality of test results may be analyzed by determining an error signature frequency for one or more test results and/or tests based at least in part on determined error signatures for test results. An error signature frequency may be determined for a test based at least in part on how often an error signature occurs for the test results of the test. For example, if there are ten test results indicating failure associated with a particular test and four of the test results are associated with an identical error signature, then the error signature frequency for the test may be determined to be 40 percent (i.e. four test results associated with the error signature divided by the number of test results for the test indicating failure). An error signature frequency may be determined based at least in part on error signatures for test results associated with one or more tests. For example, there may be ten test results for a first test. In this example, four of the test results indicate failure associated with a first error signature, three of the test results indicate failure associated with a second error signature, and three of the test results indicate that the test was successful. Furthermore, in this example, there may be five test results for a second test and three of test results may be associated with the first error signature, one of the test results may be associated with a third error signature, and one of the test results may indicate that the test was successful. In this embodiment, an error signature frequency for the first error signature may be determined to be 63.6 percent (i.e. seven test results associated with the first error signature divided by eleven total tests results indicating failure). As another example, in this embodiment, an error signature frequency for the second error signature can be determined to be 27.3 percent (i.e. three tests results associated with the second error signature divided by eleven total test results indicating failure) and an error signature frequency for the third error signature can be determined to be 9.1 percent (i.e. one test result associated with the third error signature divided by eleven total test results indicating failure).

Figure 3:
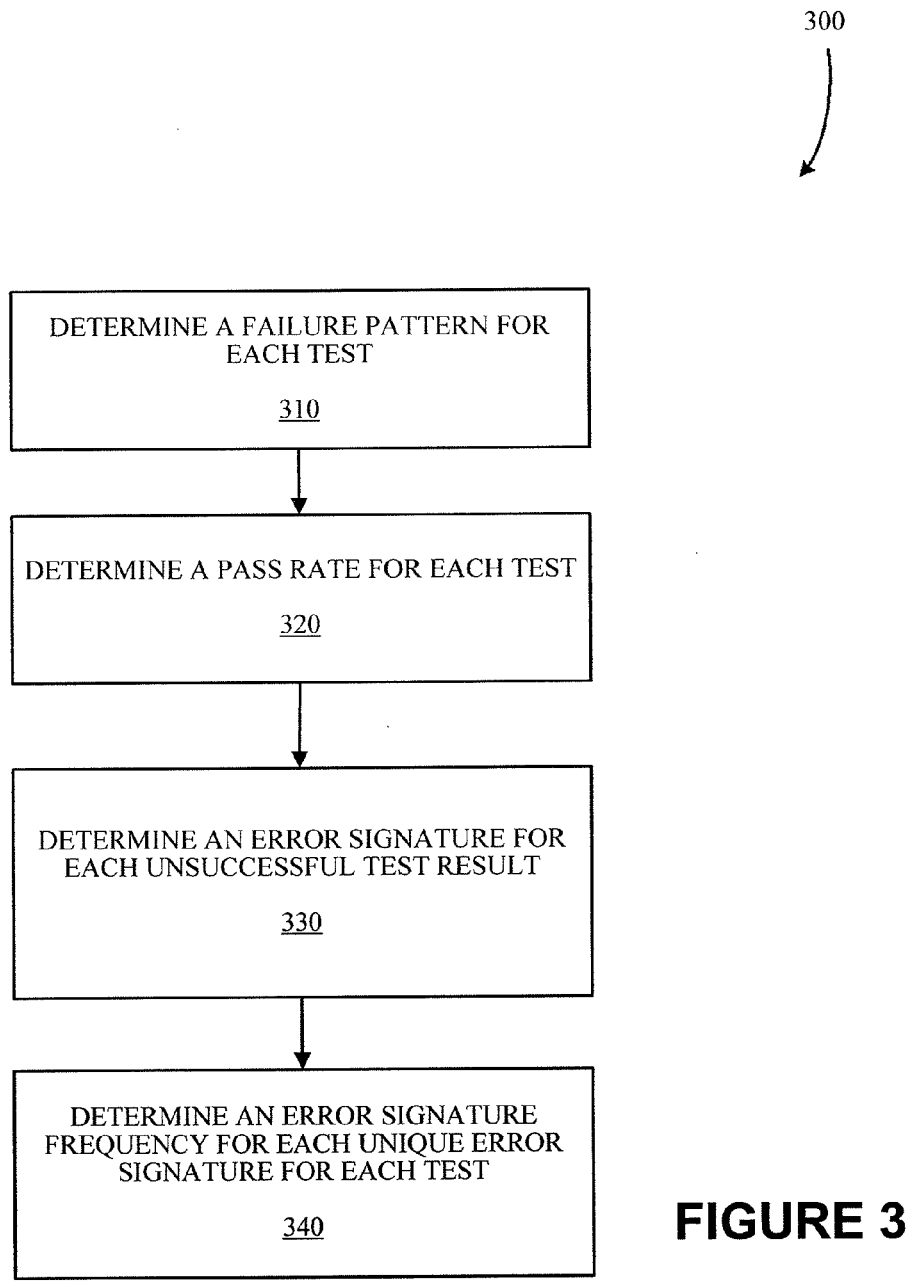
FIG. 3 is a flowchart showing an illustrative example of a process of analyzing a plurality of test results for a plurality of tests according to an embodiment.

Referring now to FIG. 3, the figure is a flowchart showing an illustrative example of a process 300 of analyzing a plurality of test results for a plurality of tests according to an embodiment. In embodiments, process 300 shown in FIG. 3 is implemented in analyzing at least a portion of the plurality of test results 220 shown in FIG. 2. In other embodiments, process 300 may be implemented independently or as a part of another process, such as process 200 shown in FIG. 2. In embodiments, all or part of the process 300 shown in FIG. 3 may be implemented by or through one or more devices such as computing device 110, data store 120, network 130, and/or server 140 shown in FIG. 1.

In the process 300 shown in FIG. 3, a failure pattern for each of a plurality of tests is determined 310. For example, four test results may be associated with a first test, three hundred test results may be associated with a second test and fifty test results may be associated with a third test. In this embodiment, a first failure pattern may be determined for the first test by analyzing at least a portion of the four test results associated with the first test. In addition, a second failure pattern may be determined for the second test by analyzing at least a portion of the three hundred test results associated with the second test. Similarly, a third failure pattern may be determined for the third test based at least in part on at least a portion of the fifty test results associated with the third test.

In the process 300 shown in FIG. 3, a pass rate for each of a plurality of tests is determined 320. For example, referring to the example above, a pass rate for the first test may be determined by dividing the number of test results that indicate that the test was successful by the total number of test results for the test. Thus, if one of the four test results associated with the first test indicates that an execution of the first test was successful, then the pass rate for the first test may be determined to be 25 percent (i.e. one successful test result out of four test results for the first test). In this embodiment, if two hundred and seventy-five test results associated with the second test have indicators that indicate that an execution of the second test was successful, then the pass rate for the second test may be determined to be $275/300$ or 0.9167.

In the process 300 shown in FIG. 3, an error signature for each test result indicating that an execution of the test was unsuccessful is determined 330. In one embodiment, each test result indicating that an execution of the test was unsuccessful is associated with an error message. In this embodiment, the error signature may be determined for a test result by hashing the error message associated with the test result. For example, referring again to the example above, if three of the four test results associated with the first test each indicate that an execution of the first test was unsuccessful and each of these three test results has an error message, then an error signature may be determined for each of the three test results by hashing the error message associated with that test result. As one example, an error message associated a first test result for the first test may be "Web Page Inaccessible", an error message associated with a second test result for the first test may be "User Log In Unsuccessful", and an error message associated with a third test result for the first test may be "Web Page Inaccessible". In this embodiment, an error signature for each of the three test results may be determined by hashing the error message associated with the test results. Thus, if an MD5 hash is used, then the determined error signature for the first test result for the first test may be "5c824112b8fcbe348516f150729645ab", the determined error signature for the second test result for the first test result may be "ab996e811626bec3a94c94f660905ae1", and the determined error signature for the third test result for the first test may be "5c824112b8fcbe348516f150729645ab".

In the process 300 shown in FIG. 3, an error signature frequency for each unique error signature within each test may be determined 340. For example, continuing to refer to the example above, three error signatures for test results associated with the first test was determined. In this embodiment, an error signature frequency for each unique (or otherwise different) error signature for the first test may be determined. In one embodiment, an error signature frequency is based on a number of the same error signatures for a test and the total number of error signatures for a test. For example, an error signature frequency associated with the error signature "5c824112b8fcbe348516f150729645ab" for the first test may be determined to be ⅔ or 66.67 percent because two of the three error signatures have the error signature "5c824112b8fcbe348516f150729645ab". Likewise, an error signature frequency associated with the error signature "ab996e811626bec3a94c94f660905ae1" for the first test may be determined to be ⅓ or 33.33 percent because one of the three error signatures have the error signature "ab996e811626bec3a94c94f660905ae1".

In another embodiment, an error signature frequency is based on a number of the same error signatures for a test and the total number of test results. For example, an error signature frequency associated with the error signature "5c824112b8fcbe348516f150729645ab" for the first test may be determined to be 2/4 or 50 percent because two of the four test results for the first test are associated with the error signature "5c824112b8fcbe348516f150729645ab". Likewise, an error signature frequency associated with the error signature "ab996e811626bec3a94c94f660905ae1" for the first test may be determined to be ¼ or 25 percent because one of the four test results for the for the first test is associated with the error signature "ab996e811626bec3a94c94f660905ae1".

Figure 4:
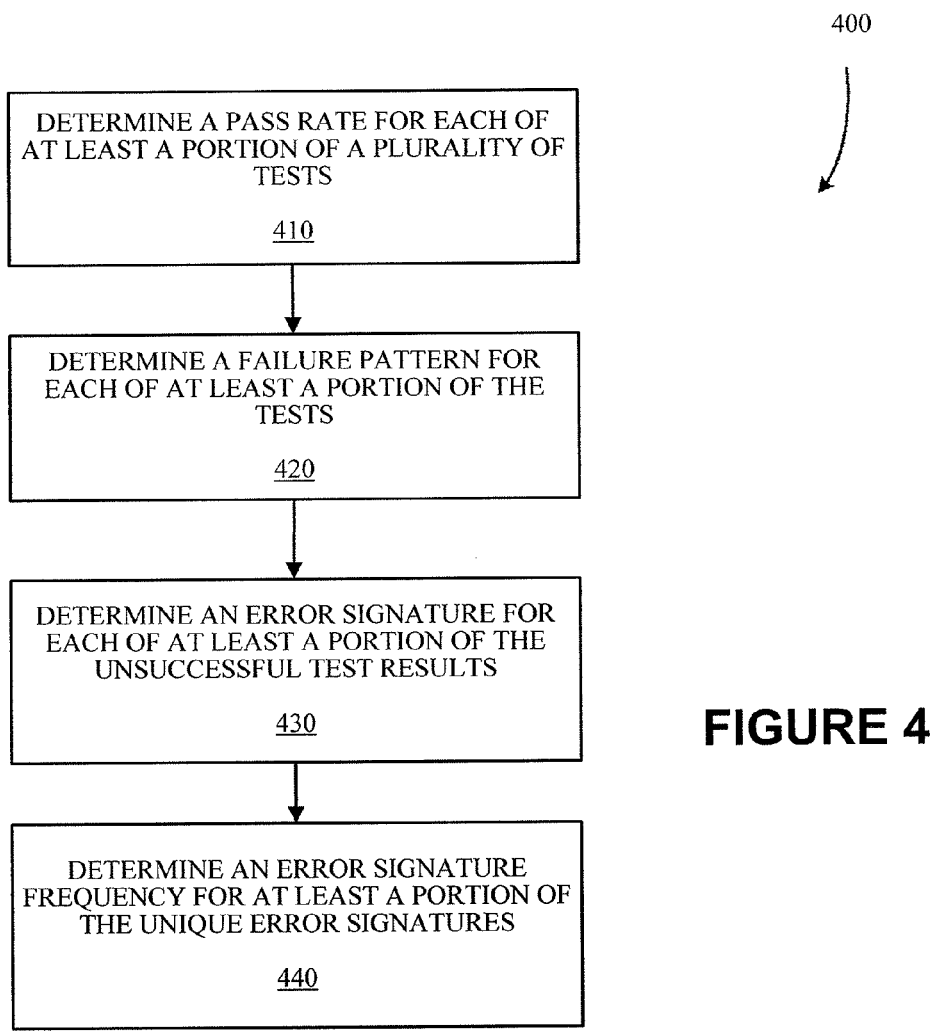
FIG. 4 is a flowchart showing an illustrative example of a process of analyzing a plurality of test results for a plurality of tests according to an embodiment.

Referring now to FIG. 4, the figure is a flowchart showing an illustrative example of a process 400 of analyzing a plurality of test results for a plurality of tests according to an embodiment. In embodiments, process 400 shown in FIG. 4 is implemented in analyzing at least a portion of the plurality of test results 220 shown in FIG. 2. In other embodiments, process 400 may be implemented independently or as a part of another process, such as process 200 shown in FIG. 2. In embodiments, all or part of the process 400 shown in FIG. 4 may be implemented by or through one or more devices such as computing device 110, data store 120, network 130, and/or server 140 shown in FIG. 1.

In the process 400 shown in FIG. 4, a pass rate for each of at least a portion of a plurality of tests is determined 410. For example, 1000 test results may each be associated with one of fifty tests. In this embodiment, a pass rate for a first test in the fifty tests may be determined by analyzing at least a portion of the 1000 test results. In one embodiment, at least a portion of the test results that are associated with the first test are analyzed. Thus, if 200 of the 1000 test results are associated with the first test, then at least a portion of the 200 test results may be analyzed to determine a pass rate for the first test. For example, if 190 of the 200 test results associated with the first test each indicate that an execution of the first test was successful, then the pass rate for the first test may be determined to be $190/200$ or 95 percent. In an embodiment, a failure rate may be determined. For example, using the previous example, a failure rate of $10/200$ or 5 percent may be determined because 10 out of the 200 test results each indicate that an execution of the first test was unsuccessful.

In the process 400 shown in FIG. 4, a failure pattern for each of at least a portion of the tests is determined 420. For example, referring back to the previous example, a failure pattern for each of the fifty tests or each of a portion of the fifty tests may be determined. Thus, if 200 test results are associated with the first test, then all or a portion of these 200 test results may be analyzed to determined a failure pattern for the first test. In one embodiment, a predetermined number of test results associated with a test may be analyzed to determine a failure pattern. For example, the latest twenty test results associated with the first test may be used to determine a failure pattern. In another embodiment, a percentage of the test results associated with a test may be used to determine a failure pattern for the test. For example, the most recent twenty-five percent of the test results associated with a test may be used to determine a failure pattern.

In the process 400 shown in FIG. 4, an error signature for each of at least a portion of the unsuccessful test results is determined 430. For example, an error signature for each of at least a portion of the test results having an indicator indicating that an execution of a test was unsuccessful and having an error message may be determined. An error signature can be determined for a test result by hashing the error message associated with the test result.

In the process 400 shown in FIG. 4, an error signature frequency for at least a portion of the unique error signatures is determined. For example, in an embodiment, ten test results out of 200 test results associated with a first test are associated with a first same error signature. In addition, in this embodiment, five test results out of 50 test results associated with a second test are associated with the first same error signature and two test results out of the 50 test results associated with the second test are associated with a second error signature. In this embodiment, an error signature frequency may be calculated for the first same error signature. For example, the error signature frequency for the first same error signature may be calculated to be $15/250$ or 6 percent. In other words, the error signature frequency may be calculated based on the number of test results having the same error signature and a total number of test results. In another embodiment, an error signature frequency may be calculated based on the number of same error signatures and a total number of error signatures associated with one or more tests. For example, in the example above, the error signature frequency for the first same error signature may be calculated to be $15/20$ or 75 percent (i.e. the 15 tests results associated with the first test or the second test each having the first error signature divided by the total number of error signatures for test results associated with the first test or the second test).

Referring back to FIG. 2, after analyzing at least a portion of the plurality of test results 220, the process proceeds to block 230. In block 230, a prioritized report based at least in part on the analyzed test results is generated. For example, referring to FIG. 1, if computing device 110 analyzes at least a portion of the plurality of test results, then computing device 110 may generate a prioritized report based at least in part on the analyzed test results.

A prioritized report based at least in part on analyzed test results may be generated in any number of ways so long as at least a portion of the generated report provides an indication of a priority for at least a portion of the report. For example, a generated report may provide an indication of a priority for one or more test results. A generated report can provide an indication of a priority for one or more tests. In an embodiment, a generated report provides an indication of a priority for one or more pass rates associated with one or more tests. In another embodiment, a generated report provides an indication of a priority for one or more error signatures or error messages, or both. In some embodiments, a generated report can provide an indication of a priority for one or more error signature frequencies.

A generated prioritized report may be in any number of electronic formats. For example, a prioritized report may be a text file, an email, a spreadsheet, a word processing document, a presentation, web page, HTML file, other document, or any other suitable format. In some embodiments, one or more prioritized reports may be dynamically generated. For example, a prioritized report may be generated that lists only the highest priority tests based at least in part on the analyzed test results. In one embodiment, analyzed information is stored in one or more databases. In such an embodiment, tests, test results, and/or analyzed information may be accessible in real-time or on demand. For example, a user interface may be provided that enables a user to generate a prioritized report based on one or more parameters selected by the user such as a time period, priority level, test name, test results, failure pattern, error message, error signature, error signature frequencies, other parameters, etc.

A prioritized report may provide an indication of priority in various ways. Priority may be indicated based on a color of the text associated with a portion of a generated report. For example, in one embodiment, a portion of a report that has red text indicates a high priority. Priority may be indicated based on a color of a background associated with a portion of a generated report. For example, if a portion of a report has a yellow background, then a medium priority may be indicated according to one embodiment. Priority may be indicated based on an ordering of information contained in at least a portion of a generated report. For example, in an embodiment, tests having a failure pattern "always fails" are listed first because they have a higher priority than other tests, such as tests having a failure pattern of "always passes". In another embodiment, tests having a pass rate classified as low (or a failure rate classified as high) are listed first in a report because these tests have a higher priority than other tests, such as tests having a 100 percent pass rate.

In one embodiment, a prioritized report provides an indication of priority by ordering information in the prioritized report. For example, in an embodiment, error messages are ordered based on a maximum error signature frequency associated with one or more tests and/or an error message. In this embodiment, if a first maximum error signature frequency is 65 and a second maximum error signature frequency is 35 percent for a test, then the error message associated with the first maximum error signature may be listed first and then the error message associated with the second maximum error signature frequency may be listed in the prioritized report. In another embodiment, a particular number of error signatures for a particular test are used. Thus, if a test is associated with three error signature frequencies, then in one embodiment only the largest error signature frequency is included in the prioritized report for that test. In another embodiment, each error signature frequency associated with a test above a threshold error signature frequency can be included in the prioritized report.

In embodiments, priority may be based on a threshold value. For example, in one report, tests associated with a pass rate of less than 90 percent may be considered "high priority" and tests associated with a pass rate between 90 percent and 95 percent may be considered "medium priority". In an embodiment, priority is based on error signature frequency. For example, if the error signature frequency is above a threshold value, then a prioritized report can indicate that an error message is considered "high priority". In other embodiments, priority may be indicated by a font type, font size, or other information that provides a user an indication of priority. In some embodiments, a legend or other guide may be provided in a generated report that a user can view to determine priority.

In some embodiments, priority may be based on, or a priority report may otherwise include, information received from additional data sources. For example, historical information for one or more tests, one or more test results, one or more error messages, one or more error signatures, and/or one or more potential solutions may be included in a priority report. Such information may be available from any number of data sources, such as one or more databases. In one embodiment, historical information associated with one or more tests may be included in a prioritized report. In an embodiment, diagnostic information may be determined or selected based at least in part on analyzed information may be included in a prioritized report. For example, if historical data or other information indicates a potential solution to a particular error message, then the potential solution and/or additional information about the potential solution may be included in a prioritized report. Numerous variations are within the scope of this disclosure.

Figure 5:
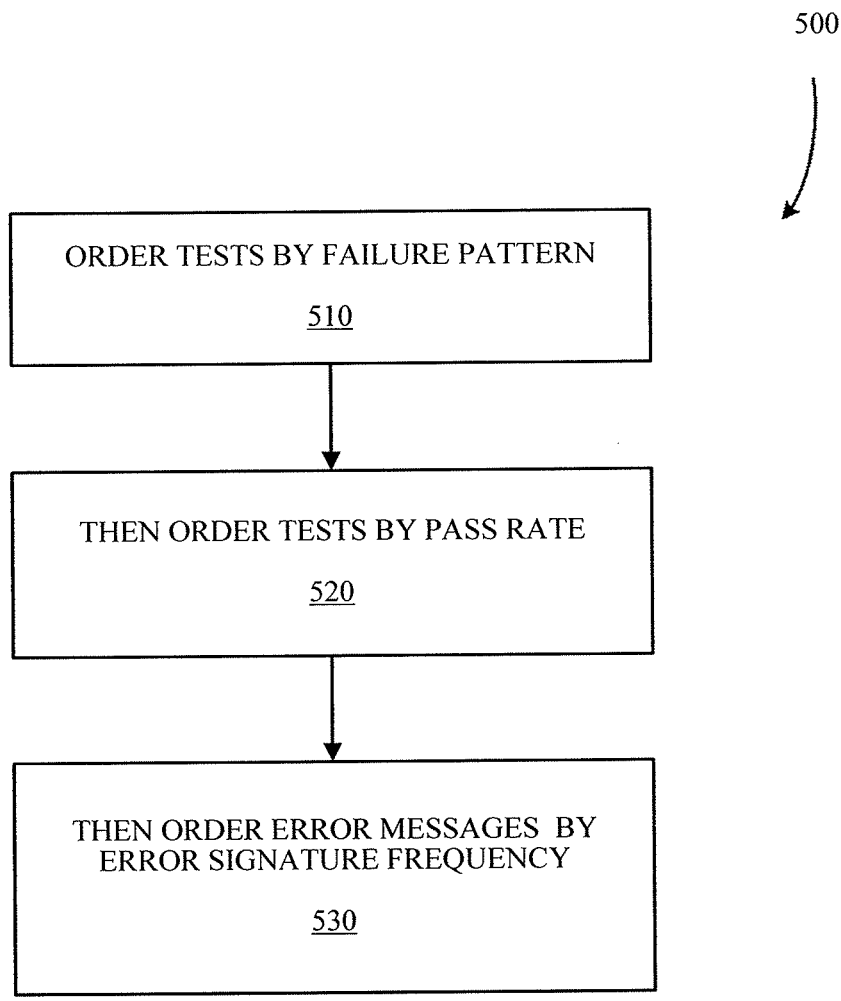
FIG. 5 is a flowchart showing an illustrative example of a process of creating a prioritized report according to an embodiment.

Referring now to FIG. 5, the figure is a flowchart showing an illustrative example of a process 500 of creating a prioritized report according to an embodiment. In embodiments, process 500 shown in FIG. 5 is implemented in creating a prioritized report based at least in part on analyzed test results 230 shown in FIG. 2. In other embodiments, process 500 may be implemented independently or as part of another process, such as process 200 shown in FIG. 2. In embodiments, all or part of the process 500 shown in FIG. 5 may be implemented by or through one or more devices such as computing device 110, data store 120, network 130, and/or server 140 shown in FIG. 1.

In the embodiment shown in FIG. 5, a prioritized report is created based at least in part by ordering information associated with the analyzed test results. The process 500 begins by ordering each of the tests by failure pattern 510. For example, in one embodiment, there may be six failure patterns. In this embodiment, the failure pattern associated with the highest priority (such as "broken", "always fails", "urgent", etc.) may be listed first. For example, each test associated with the highest priority failure pattern may be included in the first section of the priority report. Similarly, one or more of the remaining failure patterns may be included in the priority report. For example, the remaining failure patterns may be included in descending priority based on the failure patterns.

Next, in process 500, each of the tests in each failure pattern are organized by their pass rate 520. For example, each of the tests in the highest priority failure pattern may be arranged in ascending order. Thus, in this embodiment, the test associated with the lowest pass rate that has the highest priority failure pattern may be listed first. Next, the test having the second lowest pass rate that also has the highest priority failure pattern may be listed. Thus, the tests in one or more failure patterns may be arranged by their pass rates.

In one embodiment, a bucketing approach may be used to reduce noise in the sorting order. A bucketing approach may be accomplished in numerous ways. In one embodiment, one or more of the pass rates are rounded to a particular decimal place. Thus, if a pass rate is 73.89 percent, then the pass rate may be rounded up to 73.9. In another embodiment, the pass rate may be rounded down to 73.8. In some embodiments, the pass rate may be rounded to the nearest percent. Thus, if a pass rate is 34.84 percent, then the pass rate may be rounded up to 35 percent. In another embodiment, the pass rate may be rounded down to 34 percent. In one embodiment, one or more pass rates are placed into one or more categories that can be used to arrange pass rates. For example, in one embodiment, pass rates can be placed into categories that are in 5 percent increments. In another embodiment, there may be ten pass rate categories where each pass rate represents a ten percent pass rate. Thus, one category can represent pass rates from 0-10 percent, a second category can represent pass rates from 10-20 percent, a third category can represent pass rates from 20-30 percent, etc. Numerous other embodiments are within the scope of this disclosure.

Then, in process 500, under each test a list of the error messages may be included in the prioritized report 530. The error messages may be ordered based on an error signature frequency associated with the test and/or error message. For example, if a first error signature frequency is 75 percent and a second error signature frequency is 20 percent for a test, then the error message associated with the first error signature frequency may be listed first and then the error message associated with the second error signature frequency may be listed in the prioritized report. In one embodiment, the error messages are ordered based on a maximum error signature frequency associated with one or more tests and/or an error message. For example, in this embodiment, if a first maximum error signature frequency is 70 and a second maximum error signature frequency is 25 percent for a test, then the error message associated with the first maximum error signature may be listed first and then the error message associated with the second maximum error signature frequency may be listed in the prioritized report. In another embodiment, a particular number of error signatures for a particular test are used. Thus, if a test is associated with three error signature frequencies, then in one embodiment only the largest error signature frequency is included in the prioritized report for that test. In another embodiment, each error signature frequency associated with a test above a threshold error signature frequency can be included in the prioritized report.

Figure 6:
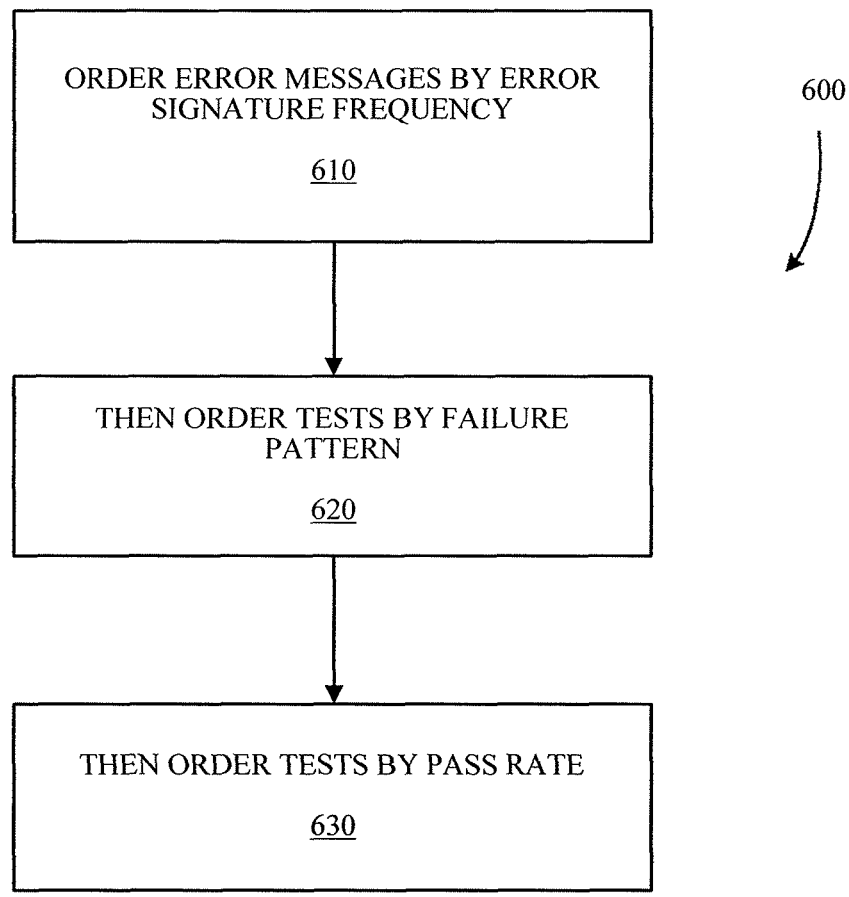
FIG. 6 is a flowchart showing an illustrative example of a process of creating a prioritized report according to an embodiment.

Referring now to FIG. 6, the figure is a flowchart showing an illustrative example of a process 600 of creating a prioritized report according to an embodiment. In embodiments, process 600 shown in FIG. 6 is implemented in creating a prioritized report based at least in part on analyzed test results 230 shown in FIG. 2. In other embodiments, process 600 may be implemented independently or as part of another process, such as process 200 shown in FIG. 2. In embodiments, all or part of the process 600 shown in FIG. 6 may be implemented by or through one or more devices such as computing device 110, data store 120, network 130, and/or server 140 shown in FIG. 1.

In the embodiment shown in FIG. 6, a prioritized report is created based at least in part by ordering information associated with the analyzed test results. The process 600 begins by ordering error messages based on error signature frequencies 610. For example, a first error message may be associated with a first error signature frequency of 15 percent, a second error message may be associated with a second error signature frequency of 60 percent, and a third error message may be associated with a third error signature frequency of 25 percent. In this embodiment, the error messages may be ordered from the error message associated with the highest error signature frequency to the error message associated with the lowest error signature frequency. Thus, in this embodiment, the second error message would be listed, then the third error message, and finally the first error message.

Next, in process 600, tests are listed under each error message based on their failure pattern 620. Thus, referring to the example above, if a test result for a first test is associated with the second error message and the failure pattern for the first test indicated that the test is always failing, then the first test may be listed before a second test that is associated with another test result having the second error message where the second test's failure pattern indicates that the test appears fixed.

Next, in process 600, tests having the same failure pattern are ordered based at least in part on their pass rate 630. Thus, in one embodiment, ten tests may have test results associated with a first error message. In this embodiment, seven of the tests may be associated with an "always failing" failure pattern and three of the tests may be associated with an "appears failing" failure pattern. In this embodiment, the seven tests having the "always failing" failure pattern may be organized from the lowest pass rate to the highest test rate and the three tests having the "appears failing" failure pattern may be arranged from the lowest pass rate to the highest pass rate.

Referring now to FIG. 7, the figure illustrates a prioritized report 700 according to an embodiment. In embodiments, report 700 shown in FIG. 7 represents an example of a prioritized report generated by block 230 shown in FIG. 2. In embodiments, all or part of the report 700 shown in FIG. 7 may be generated dynamically or in combination with user input by one or more devices such as computing device 110, data store 120, network 130, and/or server 140 shown in FIG. 1.

In the embodiment shown in FIG. 7, the prioritized report 700 arranges each test based on a pass rate for the test. For example, in FIG. 7, the tests are arranged from lowest pass rate to highest pass rate. In addition to having a priorities order for the tests, the report 700 shown in FIG. 7 further indicates the priority of a test based on the shading of the pass rate. For example, the "User Interface Test 4" in FIG. 7 has a 0.00 pass rate and, thus, has a high priority which is indicated by the black background for the pass rate for "User Interface Test 4". In the embodiment shown in FIG. 7, the background color for the pass rates of the "User Interface Test 1" and the "User Interface Test 3" are dark gray because they have a pass rate greater than 0 percent but less than 90 percent. Furthermore, the background color for the pass rate of the "API Test 1" is light gray because this test is associated with a pass rate greater than 90 percent but less than 95 percent. Thus, FIG. 7 provides one example of a prioritized test report according to one embodiment. Numerous additional embodiments are disclosed herein and variations of embodiments explicitly disclosed herein are considered as being within the scope of the present disclosure.

Referring now to FIG. 8, the figure illustrates a prioritized report 800 according to an embodiment. In embodiments, report 800 shown in FIG. 8 represents an example of a prioritized report generated by block 230 shown in FIG. 2. In embodiments, all or part of the report 800 shown in FIG. 8 may be generated dynamically or in combination with user input by one or more devices such as computing device 110, data store 120, network 130, and/or server 140 shown in FIG. 1.

In the embodiment shown in FIG. 8, the prioritized report 800 arranges the tests by failure pattern, then by pass rate, then by maximum error signature frequency. For example, in FIG. 8, the tests are arranged from failure patterns that indicate a higher priority to failure patterns that indicate a lower priority. Thus, in FIG. 8, failures patterns that indicate that a test is always failing are displayed higher on the prioritized report than failure patterns that indicate that a test is always passing. In the prioritized report 800 shown in FIG. 800, the pass rates within each failure pattern are arranged from failure patterns that indicate a higher priority to failure patterns that indicate a lower priority. Thus, in FIG. 8, a pass rate of 0.4 is displayed higher on the prioritized report than a pass rate of 0.7 if both the pass rates are within the same failure pattern. In the prioritized report 800 shown in FIG. 8, the report is then ordered by maximum error signature frequency. In one embodiment, a higher maximum error signature frequency can indicate that a particular error is occurring for the test. Thus, in an embodiment, a higher maximum error signature frequency indicates that a particular dependency for the test is not operating properly. For example, the "User Interface 3" test shown in FIG. 8 is associated with a maximum error signature frequency of 1.0 or 100%. In this embodiment, the maximum error signature frequency indicates that the same error message is the cause of the test failing in each test run. Therefore, the maximum error signature frequency of 1.0 for the "User Interface 3" test is shown before the maximum error signature frequency of 0.5 for the "User Interface 1" test. Numerous additional embodiments are disclosed herein and variations of embodiments explicitly disclosed herein are considered as being within the scope of the present disclosure.

In the embodiment shown in FIG. 8, one or more executions for a test may contain a test result that indicates that the test was neither successful nor unsuccessful. For example, in the "Test History" column shown in FIG. 8, a successful test result is shown as "1", an unsuccessful result is shown as a "0", and other test results are shown as "-". A particular results can indicate that an execution was neither successful nor unsuccessful for any number of reasons. For example, in one embodiment, a test itself may be unavailable when an execution is attempted. In this embodiment, the test result indicates that the execution was indeterminate because the test could not be executed and, thus, "-" is shown in FIG. 7 for that test result. In embodiments, a test result having neither a successful or unsuccessful indicator can be managed in numerous ways. In one embodiment, such test results are ignored and not counted as a test run. Thus, if a test has three successful test results, one unsuccessful test result, and two undetermined test results, then in this embodiment the pass rate for the test may be determined to be 75 percent (i.e. three successful test results out of four successful/unsuccessful test results). In another embodiment, indeterminate test results are presumed to be successful. Thus, in this embodiment, the pass rate is determined to be 83.3 percent (i.e. three successful test results and two undetermined test results out of six total test results). In yet another embodiment, indeterminate test results are presumed to be unsuccessful. Therefore, in this embodiment, the pass rate is determined to be 50 percent (i.e. three successful test results out of six total test results). Numerous additional embodiments are disclosed herein and variations of embodiments explicitly disclosed herein are considered as being within the scope of the present disclosure.

Referring back to FIG. 2, after generating a prioritized report based at least in part on the analyzed test result 230, the process 200 proceeds to block 240. In block 240, at least a portion of the generated report is sent or displayed. For example, referring to FIG. 1, if computing device 110 generates the prioritized report based at least in part on the analyzed test results, then at least a portion of the generated report may be displayed on a display associated with computing device 110. As another example, if computing device 110 generates the prioritized report, then computing device 110 may send at least a portion of the generated report through network 130 via email to an email address.

One or more generated reports may be displayed on any number of devices such as a tablet, mobile phone, desktop, laptop, or another suitable computing device. One or more generated reports may be sent via any suitable communication networks. For example, one or more generated reports may be sent via email, fax, text message, or another suitable notification.

Figure 9:
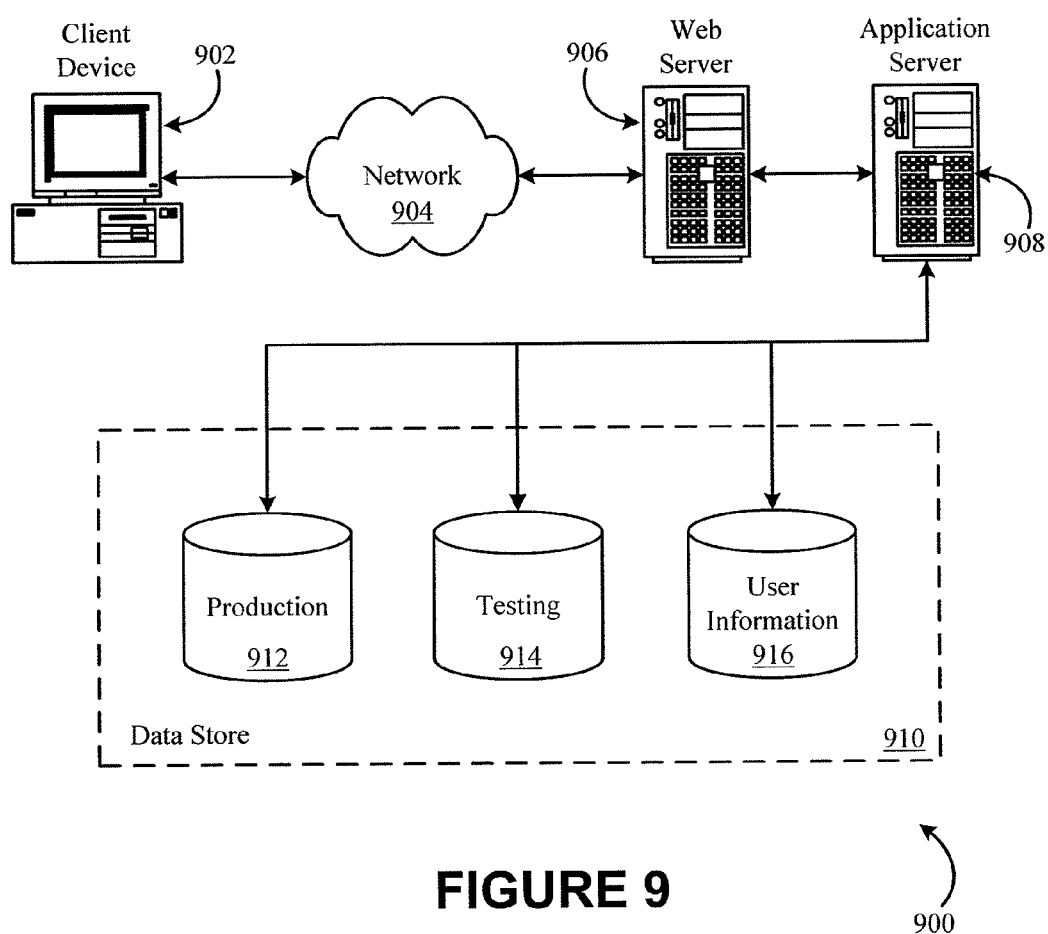
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for prioritizing tests based on test results, comprising:
   under the control of one or more computer systems configured with executable instructions,
      receiving a plurality of test results for each of a plurality of tests, each test result comprising an indicator indicating whether the test was successful or unsuccessful, each test result having an indicator that indicates that the test was unsuccessful further comprising an error message;

determining, for each test in the plurality of tests, a failure pattern selected from a plurality of predetermined failure pattern categories, wherein the failure pattern is selected based at least in part on a pattern of indicators for successive test results of the test, the indicators indicating whether the test was successful or unsuccessful;

determining, for each test in the plurality of tests, a pass rate based at least in part on a proportion of the test results having indicators indicating that the test was successful;

determining, for each test result having the indicator indicating that the test was unsuccessful, an error signature for the test result based at least in part on the error message;

determining, for each different error signature associated with each test, an error signature frequency based at least in part on a proportion of the test results for the test associated with the error signature; and generating a report, the report prioritizing the tests based at least in part on the determined failure patterns, pass rates, and error signature frequencies, wherein the generated report is prioritized first by the determined failure patterns, then by the determined pass rates within each failure pattern, and then by the determined error signature frequencies within each pass rate.

2. The computer-implemented method of claim 1, wherein at least one of the tests in the plurality of tests is configured to evaluate functionality of at least part of an application programming interface (API) or at least part of a user interface.

3. The computer-implemented method of claim 1, wherein the plurality of predetermined failure pattern categories comprises at least one of always passes, always fails, appears broken, appears fixed, or undetermined.

4. The computer-implemented method of claim 1, wherein each of at least a subset of the plurality of tests is configured to evaluate functionality of a different service from a plurality of interdependent services.

5. The computer-implemented method of claim 1, wherein determining the error signature for the test result comprises hashing at least a portion of the error message for the test result.

6. The computer-implemented method of claim 1, wherein generating the report comprises:
ordering at least a portion of the information in the report based at least in part on the determined failure patterns, pass rates, or error signature frequencies.

7. The computer-implemented method of claim 6, further comprising:
determining, for each test in the plurality of tests, a maximum error signature frequency for the test, wherein ordering the portion of the information in the report is based at least in part on the determined maximum error signature frequencies.

8. A computer-implemented method for categorizing test results, comprising:
under the control of one or more computer systems configured with executable instructions,
receiving a plurality of test results for each of a plurality of tests, each test result comprising an indicator indicating whether the test was successful or unsuccessful;

determining, for each of at least a portion of the plurality of tests, a failure pattern being a sequence of indicators for successive test results for the test, a pass rate based at least in part on a proportion of the test results having indicators indicating that an execution of the test was successful, and an error frequency based at least in part on a frequency with which an error type occurs, the error type determined based at least in part on the failure pattern; and generating a report, wherein the generated report is prioritized first by the determined failure patterns, then by the determined pass rates within each failure pattern, and then by the determined error frequencies within each pass rate.

9. The computer-implemented method of claim 8, further comprising:
determining, for each of at least a portion of the plurality of test results, an error signature, the error signature based at least in part on at least a portion of an error message associated with the test; and
wherein the generated report is based at least in part on the determined error signatures.

10. The computer-implemented method of claim 9, wherein:
the method further comprises determining, for each of at least a portion of the determined error signatures, an error signature frequency, wherein the error signature frequency based at least in part on a proportion of the error signatures; and
the generated report is based at least in part on the determined error signature frequencies.

11. The computer-implemented method of claim 9, wherein:
the method further comprises determining, for each of at least a subset of the plurality of tests, a maximum error signature frequency, wherein the maximum error signature frequency is based at least in part on the error signature frequency; and
the generated report is based at least in part on the determined maximum error signature frequencies.

12. The computer-implemented method of claim 8, wherein the generated report arranges the portion of the tests from a highest priority to a lowest priority.

13. The computer-implemented method of claim 8, further comprising:
sending the generated report to at least one electronic address.

14. A computer system for generating prioritized reports, comprising:
one or more processors; and
memory, including executable instructions that, when executed by the one or more processors, cause the computer system to at least:
receive a plurality of test results for each of a plurality of tests, each test result comprising an indicator indicating whether the test was successful or unsuccessful, each test result of at least a subset of test results having an indicator that indicates that the test was unsuccessful further comprising an error message;
determine, for each of at least a subset of the plurality of tests, a categorization based at least in part on a pattern of indicators for that test;
determine, for each of at least a portion of the test results having an indicator indicating that the test was unsuccessful, an error signature for the test result, the error signature based at least in part on the error message;

determine, for each of at least a portion of the determined error signatures, an error signature frequency based at least in part on a proportion of the determined error signatures having the same error signature; and generate a report, the report providing an indication of a priority for at least a portion of the report, based at least in part on the categorization of each test, wherein the generated report is prioritized first by the determined categorization, then by a pass rate calculated as a proportion of successful indicators in each pattern of indicators, and then by the determined error signature frequency.

15. The computer system of claim 14, further including executable instructions that, when executed by the one or more processors, cause the computer system to at least:

determine, for each of at least a portion of the plurality of tests, a failure pattern based at least in part on indicators for successive test results for the test, the failure pattern selected from a plurality of predetermined failure pattern categories; and wherein the generated report is based at least in part on the determined failure patterns.

16. The computer system of claim 14, further including executable instructions that, when executed by the one or more processors, cause the computer system to at least:

determine, for each of at least a portion of the plurality of tests, a failure rate based at least in part on the number of the plurality of test results associated with the test; and wherein the generated report is based at least in part on the determined failure rates.

17. The computer system of claim 14 wherein determining the error signature comprises hashing at least a portion of the error message associated with the test result.

18. The computer system of claim 14, wherein generating the report comprises:

determining, for each of at least a portion of the test results, a priority based at least in part on determined error signatures;

determining an order for the portion of the test results, the order indicating the priority of the test results; and generating the report based at least in part on the determined order for the portion of the test results.

19. The computer system of claim 14, wherein generating the report comprises:

determining at least a portion of the report having a high importance; and visually indicating the high importance of the portion of the report.

20. One or more non-transitory computer-readable storage media having collectively stored thereon instructions that, when executed by one or more processors of a computer system, cause the computer system to at least:

receive a plurality of test results for each of a plurality of tests, each test result comprising an indicator indicating whether the test was successful or unsuccessful, each test result of at least a subset of test results having an indicator that indicates that the test was unsuccessful further comprising an error message;

determine, for each of at least a portion of the plurality of tests, a failure pattern, the failure pattern selected from a plurality of predetermined failure pattern categories by comparing a sequence of indicators for the test to the predetermined failure pattern categories;

determine, for each of at least a portion of the plurality of test results having an indicator indicating that the test was unsuccessful, an error signature for the test result based at least in part on the error message;

determine, for at least a portion of the determined error signatures, an error signature frequency based at least in part on a proportion of the test results for the test associated with the error signature; and generate a report, wherein the generated report is prioritized first by the determined failure pattern, then by a pass rate calculated as a proportion of indicators indicating a successful test to total indicators for each test, and then by the determined error signature frequencies within each pass rate.

21. The one or more non-transitory computer-readable storage media of claim 20, further comprising instructions that, when executed by a computer system, cause the computer system to at least:

send at least a portion of the generated report to at least one electronic address.

22. The one or more non-transitory computer-readable storage media of claim 20, further comprising instructions that, when executed by a computer system, cause the computer system to at least:

obtain historical information associated with at least one error signature; and based at least in part on the obtained historical information, determine a potential solution associated with the at least one error signature, wherein the generated report includes the potential solution.

23. The one or more non-transitory computer-readable storage media of claim 20 wherein the error signature is determined at least by hashing a portion of the error message associated with the test result.

24. The one or more non-transitory computer-readable storage media of claim 20, further comprising instructions that, when executed by a computer system, cause the computer system to at least:

receive a request for the report;

in response to receiving the request for the report, dynamically generate the report; and display the report, wherein at least a portion of the report is ordered based at least in part on the determined error signatures.

* * * * *